Dec. 28, 1954  H. G. SMITH ET AL  2,698,012
VALVE STEM SEAL
Filed Aug. 2, 1952

H. G. SMITH
J. J. COURY
    INVENTORS

BY
    ATTORNEYS

__UNITED STATES PATENT OFFICE__

2,698,012
Patented Dec. 28, 1954

2,698,012

VALVE STEM SEAL

Harry G. Smith, Dearborn, and Joseph J. Coury, Allen Park, Mich., assignors to Ford Motor Company, Dearborn, Mich., a corporation of Delaware Application August 2, 1952, Serial No. 302,312

4 Claims. (Cl. 123—188)

This invention is concerned with the valve gear of internal combustion engines and more specifically with a method and means for preventing the leakage of fuel or lubricant between the valve and valve bushing. It is necessary that this type of leakage be prevented in order to avoid such deleterious side effects as dilution of the lubricant between the valve and valve bushing by fuel or sticking of the valve in the valve bushing due to the carbonization of excess oil leaking between these two members.

The industry has long been cognizant of this problem and has attempted to solve it in various and sundry ways. However, after considerable testing, the structure of the instant invention has been found to be by far the more economical and generally satisfactory. As typical of the endeavors of the prior art to solve this problem, attention is invited to U. S. Letters Patent 1,230,689, issued June 19, 1917, to F. G. Dahlgren, and U. S. Letters Patent 1,711,267, issued April 30, 1929, to A. E. Hutt.

The precise solution proposed by applicants can best be understood by a study of the drawings in which.

Figure 1:
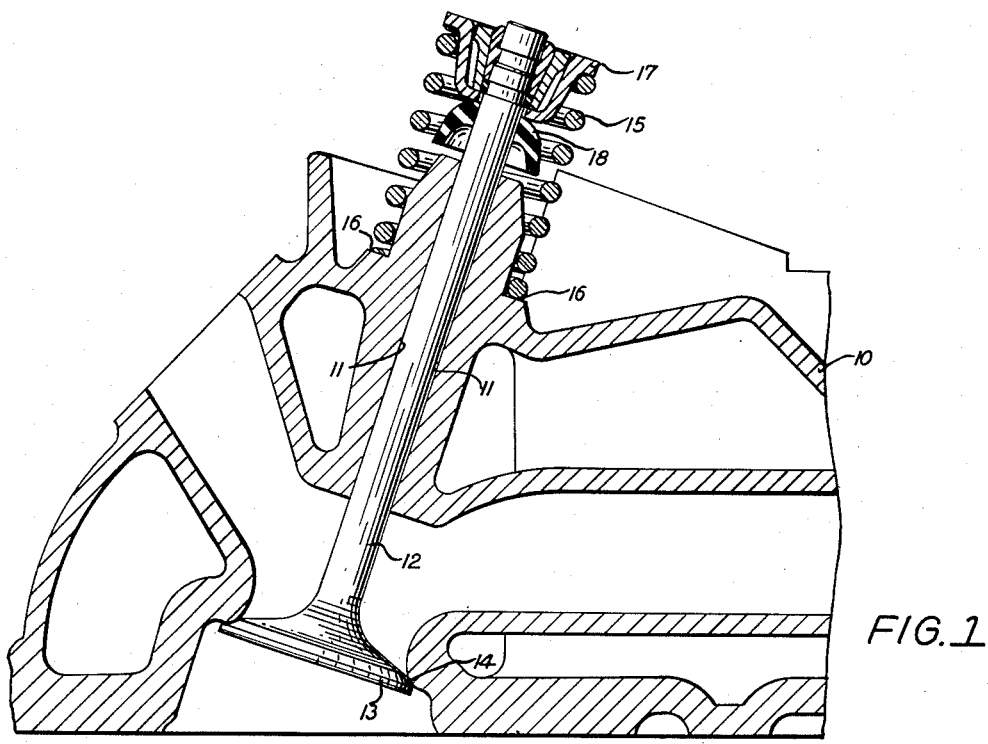
Figure 1 is a cross section through an overhead valve cylinder head along the center line of an exhaust valve.

In Figure 1 the cylinder head is indicated generally at 10. Valve guide 11 is bored into cylinder head 10 for the reception of exhaust valve 12. As usual, exhaust valve 12 is spring biased to the closed position, in which position valve head 13 abuts valve seat 14. This spring bias is accomplished by valve spring 15. One end of valve spring 15 seats upon shoulder 16 in cylinder head 10, and the other upon washer 17, which is secured to the stem end of exhaust valve 12.

Figure 2:
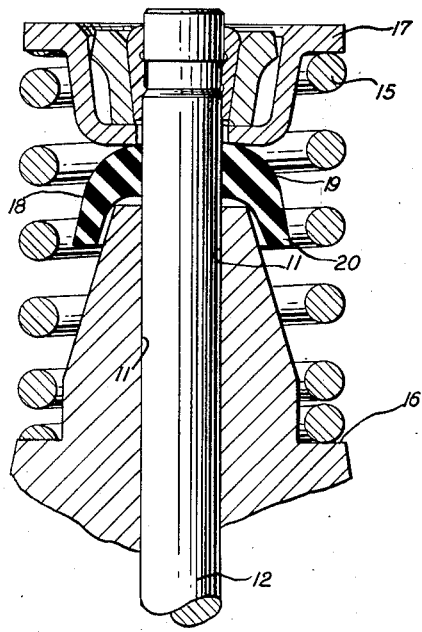
Figure 2 is an enlarged sectional view of that portion of the valve gear with which this invention is immediately concerned.

Figure 2 is the same structure shown in Figure 1, except enlarged to show the structure in greater detail.

To prevent the leakage of oil or other liquid around the valve 12, elastomer seal 18 is provided on the stem of valve 12. As is partly seen in Figure 2, elastomer seal 18 comprises a base 19 and a dependent flared skirt 20. Base 19 has a central opening somewhat smaller than the diameter of the valve stem to which it is to be applied. In the installation of this valve gear the valve stem is thrust through valve guide 11 until valve head 13 is seated upon valve seat 14. While the valve is held so seated, elastomer seal 18 is forced over the valve stem and thrust in a downwardly direction until further movement is stopped by contact between elastomer seal 18 and the top of valve guide 11.

The remainder of the valve actuating mechanism is then assembled. It is apparent from a study of the drawings that the first time the valve is opened the elastomer seal 18 will be forced axially along the valve stem to a position where it is just in contact with the top of valve guide 11 when the valve is in the fully opened position. Having assumed this position, the elastomer seal 18 will thereafter move only with the valve stem. No relative motion of the seal and valve is contemplated. It has been found that no extensive overhang of elastomer seal 18 is necessary, nor is it necessary that fine clearances be maintained between elastomer seal 18 and the valve guide. In fact, the rather generous clearances provided permit sufficient oil mist to contact the valve stem to lubricate it, but do not permit any droplets of oil as such to run down the valve stem and penetrate the working space between the valve stem and the valve guide 11.

We claim as our invention:

1. An internal combustion engine comprising a poppet valve and an elastomer valve seal, said seal comprising a heavy annular base and a comparatively thin integral dependent flared skirt, the opening in the annular base being substantially smaller in its original dimensions than the valve stem whereby the seal is secured to the stem by friction only and moves in synchrony with the valve.

2. An internal combustion engine comprising a poppet valve and an elastomer valve seal, said seal comprising a heavy annular base and a comparatively thin integral dependent flared skirt, the opening in the annular base being substantially smaller in its original dimensions than the valve stem whereby the seal is secured to the stem by friction only and moves in synchrony with the valve, the frictional force between the valve stem and elastomer seal being greater than the axial force imparted to the elastomer seal by the acceleration of the valve.

3. In a valve stem oil deflector means for overhead valves, in combination with a vertically movable valve stem and a relatively stationary guide therefor having an upper bearing boss portion, an inverted cup-like member of elastomeric material on said valve stem above said guide and having a transverse portion and a depending skirt portion, said transverse portion having sufficient thickness for relative rigidity and said valve stem passing snugly but slidably through said transverse portion, said transverse portion abutting said guide bearing boss in one position of the valve stem, said skirt portion at that time surrounding the boss portion but spaced from the guide.

4. The combination of an internal combustion engine having an overhead poppet valve, a valve guide in which the stem of said valve reciprocates, and an oil seal comprising an annulus of elastomeric material through which said valve stem extends, the central opening of said annulus being of such diameter and thickness that it resiliently but firmly adheres to said valve stem and reciprocates in synchrony therewith, said seal including an integral continuation of said annulus extending therefrom radially sufficient to deflect descending oil from the valve stem adjacent to said valve guide.

References Cited in the file of this patent

UNITED STATES PATENTS

| Number | Name | Date |
|---|---|---|
| 1,230,689 | Dahlgren | June 19, 1917 |
| 1,711,267 | Hutt | Apr. 30, 1929 |

OTHER REFERENCES

Popular Science Magazine, October 1952 (page 200).